United States Patent
Mayer et al.

(10) Patent No.: US 9,253,426 B2
(45) Date of Patent: Feb. 2, 2016

(54) MOVING IMAGE SENSOR HAVING MULTIPHASE DIGITAL SUMMATION AND CHARGE STORAGE NODES SEPARATED FROM PHOTODIODES BY CHARGE TRANSFER GATES

(71) Applicant: E2V Semiconductors, Saint-Égrève (FR)

(72) Inventors: Frédéric Mayer, Voiron (FR); Henri Bugnet, Moirans (FR)

(73) Assignee: E2V SEMICONDUCTORS, Saint-Égréve (FR)

( * ) Notice: Subject to any disclaimer, the term of this patent is extended or adjusted under 35 U.S.C. 154(b) by 93 days.

(21) Appl. No.: 14/353,183

(22) PCT Filed: Oct. 18, 2012

(86) PCT No.: PCT/EP2012/070658
§ 371 (c)(1),
(2) Date: Apr. 21, 2014

(87) PCT Pub. No.: WO2013/064380
PCT Pub. Date: May 10, 2013

(65) Prior Publication Data
US 2014/0263969 A1 Sep. 18, 2014

(30) Foreign Application Priority Data

Nov. 4, 2011 (FR) ...................................... 11 60040

(51) Int. Cl.
*H04N 5/372* (2011.01)
*H04N 5/3745* (2011.01)

(52) U.S. Cl.
CPC ........... *H04N 5/372* (2013.01); *H04N 5/37206* (2013.01); *H04N 5/37457* (2013.01)

(58) Field of Classification Search
CPC ............ H04N 5/37452; H04N 5/3745; H04N 5/3535; H04N 5/3742; H04N 5/37206; H01L 27/14806
USPC ................... 250/214 R, 208.1; 348/272–311; 358/474–494; 235/455
See application file for complete search history.

(56) References Cited

U.S. PATENT DOCUMENTS 8,736,925 B2 * 5/2014 Mayer ................ H04N 5/37206
235/455
2008/0217661 A1 9/2008 Lauxtermann
2009/0295971 A1 12/2009 Tsuchiya

OTHER PUBLICATIONS

International Search Report for PCT/EP2012/070658 dated Mar. 12, 2012.

*Primary Examiner* — Que T Le
(74) *Attorney, Agent, or Firm* — Hauptman Ham, LLP

(57) ABSTRACT

The invention relates to time-delay and charge integration image sensors employing active CMOS technology pixels. The sensor comprises N rows of pixels and each pixel of generally square shaped comprises two (though possibly also three or four) photodiodes and charge storage nodes, having means for transferring charges from each photodiode to one or other of the storage nodes. Control of transfer from the photodiodes to one then the other of the storage nodes is carried out in such a way that one storage node receives in succession, during two successive phases of a periodic cycle, the charges from two photodiodes that have seen the same image portion during the two phases. The charges received by one of the storage nodes during the first phase is added to the charges received by the other storage node in the following phase.

17 Claims, 10 Drawing Sheets

MOVING IMAGE SENSOR HAVING MULTIPHASE DIGITAL SUMMATION AND CHARGE STORAGE NODES SEPARATED FROM PHOTODIODES BY CHARGE TRANSFER GATES

FIELD

The invention relates to linear time-delay and integration sensors (TDI sensors) in which an image of a line of points of an observed scene is reconstructed by adding images taken in succession by a plurality of photosensitive rows observing a given line of the scene in succession as the scene moves past in front of the sensor perpendicularly to the rows.

BACKGROUND

The sensors are for example used in systems for observing the Earth by satellite. They comprise a plurality of parallel rows of photosensitive pixels; the sequencing of circuits for controlling the various rows (control of exposure time then read out of the photogenerated charges) is synchronized with the relative movement of the scene and sensor, so that all the rows of the sensor see a single line of the observed scene. The generated signals are then added point-by-point for each point of the observed line.

The theoretical signal-to-noise ratio is improved proportionally to the square root of the number N of rows in the sensor. This number may range from a few rows to about a hundred rows depending on the application (industrial quality control, terrestrial observation, panoramic dental radiography or mammography).

In charge transfer sensors (CCD sensors), point-by-point addition of the signals is achieved naturally without read noise by emptying into a row of pixels the charges generated and accumulated in the preceding row of pixels, in sync with the relative movement of the scene and sensor. The last row of pixels, having accumulated N times the charges generated by the observed scene line, may then be transferred to an output register and converted, in a read phase, into an electrical voltage or current.

Such charge transfer sensors are either made in conventional technologies with adjacent transfer gates produced from at least two polysilicon levels, the second level partially covering the first, or in technologies employing a single polysilicon gate level, these single-level technologies being more compatible with current technologies for manufacturing CMOS logic integrated circuits.

However, charge sensors using active CMOS technology pixels have advantages and an example thereof has been described in patent application WO 2008034794. Charges are not transferred row-to-row since the active pixels do not operate in a charge transfer mode but deliver a voltage to a column conductor. In order to add the signals corresponding to a given image line seen by the various pixel rows, an analog/digital conversion is used to deliver a digital representation of the output of each pixel, and N digital values issued from N pixels that have seen the image point in succession during the movement are added. However, the principle described in this application does not allow veritable correlated double sampling read out.

In addition, one problem encountered with time-delay and integration sensors is degradation of the modulation transfer function due to the fact that the relative movement of the scene in front of the sensor is continuous whereas the pixel information is processed discretely. Thus, an image of black and white bars of the pitch of the pixels, which would deliver, as output from the sensor, a peak-to-peak signal amplitude of unitary value if the image were static (omitting the purely geometric modulation transfer function) delivers only a peak-to-peak amplitude of 0.64 if the image is moving. This value of 0.64 is the movement component of the modulation transfer function (there are other components related to other factors which may further degrade the overall modulation transfer function).

Of course, the size of the pixels could be decreased in order to compensate for the poor modulation transfer function by increasing theoretical resolution. By dividing the pitch of the pixels by two, resolution is multiplied by two. However, in this case the number of analog/digital converters must also be multiplied.

Another constraint on image capture with CMOS technology pixels is the need to expose all the rows of pixels during the same time window of adjustable duration if possible (global shutter operating mode) and not during successive windows of the same duration but shifted in time from one row to the next (rolling shutter operating mode).

Lastly, it will be recalled that image capture with CMOS technology pixels comprising four or five transistors is subject to kTC read noise that it is necessary to attempt to reduce by carrying out a correlated double sampling read out; this means that it is necessary first to attempt to read a reset level of a charge storage node before transferring active charges to this node. In known CMOS technology sensors, the global shutter operating mode is incompatible with veritable correlated double sampling.

SUMMARY

The aim of the invention is to provide a TDI sensor structure employing active CMOS pixels, which structure increases the value of the movement-related modulation transfer function while enabling a veritable correlated double sampling read out and a global shutter operating mode preferably with an adjustable integration duration. For this purpose, a sensor is provided the pixels (of generally square shape) of which comprise at least two, and optionally three or even four, photodiodes that are arranged in succession in the direction of the movement of the image in front of the sensor, having charge storage nodes between the photodiodes of the pixel and between the photodiodes of adjacent pixels in a given column of pixels, and having two transfer gates associated with each photodiode, between the photodiode and the two nodes that flank it. The storage nodes of a pixel of rank i are connected to a column conductor and there are as many sampling and analog/digital conversion circuits as there are pixels in a column. The transfer gates are controlled so as to transfer the charge from one photodiode either to a storage node located downstream of the photodiode or to a node located upstream. This control of the gates is carried out in a periodic cycle made up of a plurality of phases (as many phases as photodiodes in the pixel). The period of the cycle is the time it takes the sensor and the scene to move relative to each other by a distance equal to the height of the pixel, i.e. equal to a pitch of the pixels in a column. In each phase there is a storage node that does not receive charges from the photodiodes; the others receive charges from the photodiodes that are adjacent to them; the node that does not receive charges is circularly permutated in each new phase. The charges received by the other storage nodes is digitized and added together, with a time shift, over the various phases of a period and over N successive periods. The addition is carried out in sync with the movement, i.e. charge issued from photodiodes that are different but that have seen the same image portion during the various phases is added.

In the case of a sensor having a two-phase operation, which is the simplest case, the square pixels comprise two photodiodes, which may be referred to as the downstream photodiode and upstream photodiode, a central charge storage node located between the two photodiodes, a downstream charge storage node located between the downstream photodiode of the pixel and the upstream photodiode of a pixel located immediately downstream of the pixel in question, and an upstream storage node located between the upstream photodiode of the pixel in question and the downstream photodiode of a pixel located immediately upstream. The downstream node, like the upstream node, is therefore shared between two adjacent pixels.

More precisely, in the case of a two-phase operation, a time-delay and charge summation image sensor is provided according to the invention, the charge summation of which is synchronized with a relative movement of the image in front of the sensor, which sensor comprises N rows of pixels distributed with a pitch D; each pixel of rank i in a column in the direction of the movement preferably has a generally square shape and comprises first and second photodiodes arranged in succession in the direction of the movement, and three charge storage nodes separated from the photodiodes by charge transfer gates; the storage nodes comprise a central node located between the two photodiodes, and two other nodes shared with the adjacent pixels, which nodes are a downstream node located between the first photodiode of the pixel of rank i and the second photodiode of the pixel of rank i+1 located immediately downstream of the pixel of rank i, and an upstream node located between the second photodiode of the pixel of rank i and the first photodiode of the pixel of rank i−1 located immediately upstream of the pixel of rank i. The sensor furthermore comprises:

- an analog/digital conversion circuit associated with each pixel; and
- means for controlling the transfer gates and the conversion circuits in order to transfer charges from a photodiode to one or other of the storage nodes that flank it then to convert these charges, in a periodic cycle of period Tp where Tp is the time it takes the image to move a distance equal to the pitch of the rows of pixels, in two phases such that:
    - at the end of a first phase the charges of the two photodiodes are transferred to the central node; and
    - at the end of a second phase, the charges of the first photodiode of the pixel of rank i and the charges of the second photodiode of the downstream pixel of rank i+1 are transferred to the downstream node, then the charges present in the downstream node are converted in the analog/digital converter of rank i associated with the pixel of rank i; and
- means for accumulating, in the converter of rank i, the results of the one or more conversions carried out during a two-phase cycle with the result accumulated beforehand in the converter of rank i−1 at the end of the preceding cycle.

In a first embodiment, selecting means are provided for selecting independently of each other the central node or the downstream node in order to read the charges that are contained thereon; in particular, the nodes may be reset independently of each other, and the charges may be read after resetting or after charge transfer independently for each node. In this case, at the end of the first phase, after the charges have been transferred to the central node, the charge on this node is converted in the conversion circuit of rank i associated with the pixel of rank i.

In another embodiment, the central node and the downstream node are electrically connected by a conductor so as to form an electrically common node; no means is provided for selecting the nodes independently of each other; in this case, the charges contained on the electrically common node are converted in the conversion circuit of rank i only at the end of the second phase but not at the end of the first phase; the charges of the two phases, originating from various photodiodes, are added analogously in the common node before being digitized. Means for resetting the common node are provided in order to reset the node during the first phase, before charges are transferred to the central node, but not during the second phase before charges are transferred to the downstream node.

In the case of a three-phase operation, the pixel, which is preferably of generally square shape, comprises three photodiodes arranged in succession in the direction of the movement, two central storage nodes between the photodiodes, and two other nodes shared with the adjacent pixels, which nodes are respectively a downstream storage node between the first photodiode of the pixel of rank i and the last photodiode of the pixel of rank i+1 located immediately downstream, and an upstream storage node between the last photodiode of the pixel of rank i and the first photodiode of the pixel of rank i−1 located immediately upstream; there are charge transfer gates between the photodiodes and the storage nodes, both inside the pixel and between the photodiodes of two adjacent pixels. The transfer gates are actuated during the three successive phases so that two of the storage nodes receive charges but not the third. The node that does not receive charges is circularly permutated from one phase to the next in such a way that the charges transferred to a storage node correspond each time to a given image portion seen by the pixel. The charges on these storage nodes are read and digitized during the three phases (a respective conversion is carried out in each phase for each of the storage nodes that have received charges, i.e. here two conversions per phase); an addition is carried out over the three phases in such a way that the added results originate each time from two adjacent photodiodes that are not the same during the three phases but that are those that have seen the same image portion during the cycle of three phases. A digital addition of the conversion results for N pixels having seen the same image portion during the movement of the sensor in front of the image is moreover carried out.

A four-phase operation or operation involving more than four phases may also be envisioned; however this increases complexity and the improvement obtained in the modulation transfer function becomes marginal.

More generally, for P phases: each pixel, preferably of generally square shape, comprises P photodiodes that are arranged in succession in the direction of the movement of the sensor in front of the image, having charge storage nodes between the photodiodes of the pixel and between the photodiodes of adjacent pixels in a given column of pixels, and having two transfer gates, associated with each photodiode, between the photodiode and the two storage nodes that are adjacent to it; the storage nodes may be selected to be connected to a column conductor and to as many analog/digital conversion circuits as there are pixels in a column, and each conversion circuit is able to carry out P−1 simultaneous conversions corresponding to the charges on P−1 storage nodes (i.e. a conversion circuit associated with a pixel comprises P−1 sampling circuits and P−1 converters working in parallel); the transfer gates are controlled so as to transfer the charges from one photodiode either to a storage node located downstream of the photodiode or to a node located upstream in a periodic cycle of period Tp corresponding to the time taken for the image to move a distance D; the cycle comprises P phases of equal duration; the control of the gates is such that in each phase there is a storage node that does not receive charges from the photodiodes, and the node that does not receive charges is circularly permutated in each new phase; the charges received by the other storage nodes is digitized and added together over the various phases of a period, in such a way that the added results originate each time from two adjacent photodiodes that are not the same during the P phases but that are those that have seen the same image portion during the cycle of P phases. A digital addition of the conversion results for N pixels having seen the same image portion during the movement of the sensor in front of the image is moreover carried out.

In order to facilitate the digital addition during the various phases and the addition between the N pixels that have seen the same image portion, provision is made for each of the analog/digital conversion circuits to operate with a counter (or more generally P−1 counters if there are P phases) the contents of which is incremented proportionally to the analog value of the signal to be converted; provision is made for the contents of the counter corresponding to the pixel of rank i to be set, at the start of a periodic two-phase (or three or more phase) cycle, but not between two (or three or more) phases of the same cycle, to a value that is the result accumulated by the corresponding counter of the conversion circuit of the preceding rank i−1.

BRIEF DESCRIPTION OF DRAWINGS

Other features and advantages of the invention will become apparent on reading the following detailed description that is given with reference to the appended drawings in which.

DESCRIPTION OF EMBODIMENTS

Figure 1:
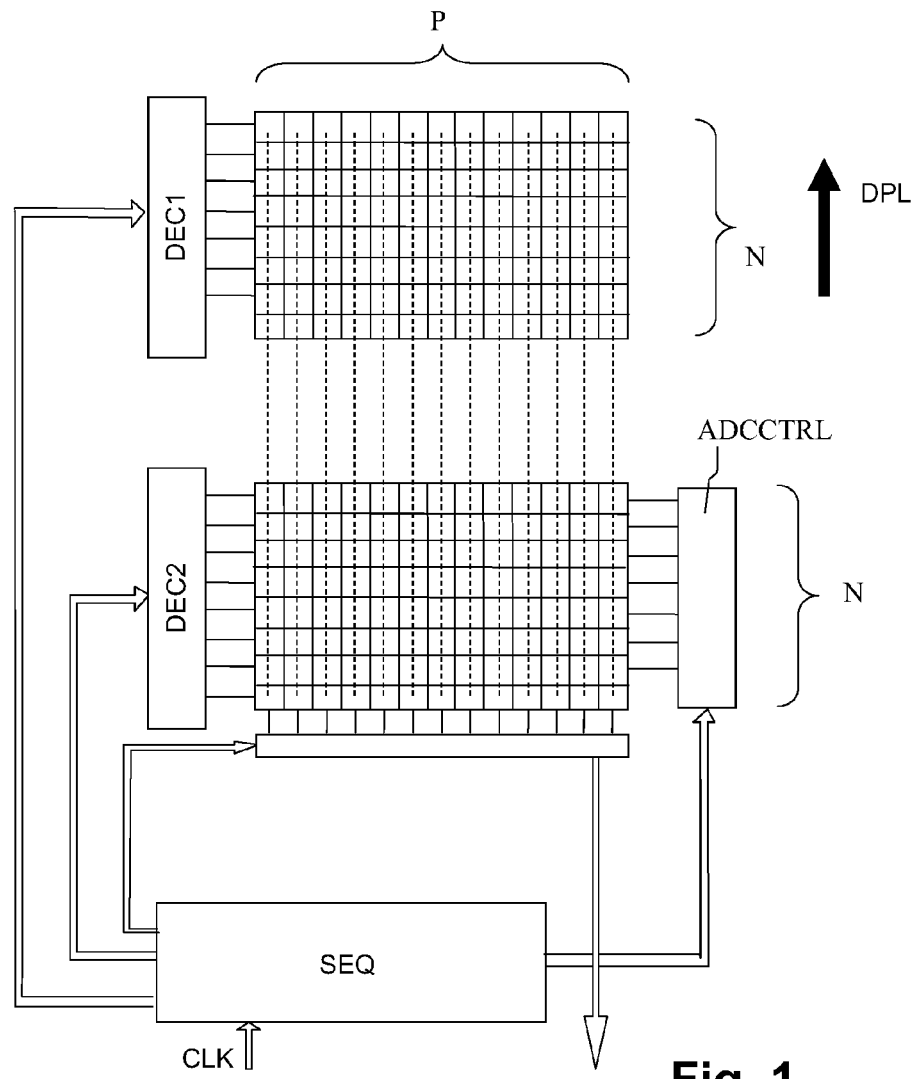
FIG. 1 shows the general architecture of a sensor according to the invention.

FIG. 1 shows a general time-delay and charge summation image sensor structure. The sensor comprises N rows of pixels; the image to be observed moves relative to the sensor in a direction shown by an arrow DPL, perpendicular to the rows, i.e. parallel to the columns of pixels. The speed of the movement is synchronized with the sequence of integration and read out of the charges generated by the light, so that if the pitch of the pixels in a column is D and the speed of the movement is V, charge integration and a read out is carried out cyclically with a time period Tp=D/V. The charges read from one of the rows of pixels during a period is added to the charges read from the preceding (relative to the direction of the arrow DPL) pixel row during the preceding period. Charges are added over N periods corresponding to observation of a given image portion by N rows of pixels in succession.

The pixels are active pixels produced in CMOS technology. They carry out charge/voltage conversion inside the pixel: each pixel collects charges generated by the light that illuminates it and transmits, to an output conductor, a potential corresponding to the charges collected during a period. The output conductor is a column conductor common to all the pixels of a given column. The pixels are addressed row-by-row so that a pixel of a row delivers a potential to its column conductor, after which the column conductor receives the potential corresponding to the pixel of the following row. A row decoder DEC1 performs this successive addressing of the rows.

The potentials present on the column conductors are sampled, preferably by double sampling, and digitized by digital/analog converters placed outside of the matrix of N rows of pixels. In the structure in FIG. 1, a matrix of conversion circuits (sampling and analog/digital conversion), a respective conversion circuit being associated with each pixel of the matrix, and a second row decoder DEC2 serving to select a row of conversion circuits when the associated row of pixels is selected by the converter DEC1, are provided.

Thus, when a row of pixels is selected for a read out of the signals (potentials) generated by the pixels of this row when the image moves in front of this row during a period Tp, a row of samplers and converters is selected at the same time. A digital result is produced for each pixel. This result is added to the results obtained in the preceding period by the preceding row of pixels, which row of pixels saw the same image portion in said preceding period. The addition is digital.

A general sequencing circuit SEQ generates the control signals required by the decoders DEC1 and DEC2 and by a control circuit ADCCTRL. The circuit SEQ is controlled by a clock signal CLK that times the read out in its entirety.

The circuit ADCCTRL is a circuit for controlling the converters, which delivers counting ramp and clock signals and conversion control pulses at well-defined moments in time.

Lastly, the decoder DEC2 also generates sampling control pulses for each row of conversion circuits.

Figure 2:
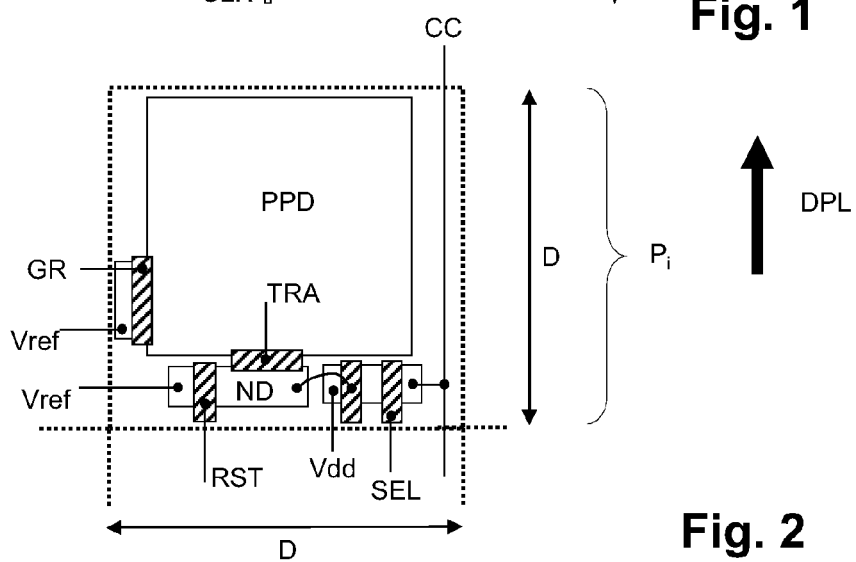
FIG. 2 schematically shows an active CMOS pixel comprising 5 transistors.

FIG. 2 shows an example individual pixel $P_i$ of rank i in a column, which individual pixel is formed on a semiconductor substrate. The pixels are preferably of generally square shape (shown by a dotted line) and distributed with a pitch D both row-wise and column-wise, in the general case where it is desired for the row-wise and column-wise resolution to be the same. The pixel $P_i$ is a conventional active pixel; it comprises:
- a photodiode PPD, generally what is called a pinned photodiode, i.e. one having a surface potential fixed by a thin doped surface layer that covers it;
- a charge storage node ND that is an $n^+$-type diffusion in the substrate;

a transfer gate (hashed) between the photodiode and the storage node, able to be controlled by a transfer signal TRA that transfers the charges generated in the photodiode to the storage node;

a read transistor having a drain connected to a supply voltage Vdd, a gate (hashed) connected to the storage node ND, and a source; this transistor delivers to its source a potential that represents the potential of the storage node;

a row selecting transistor having a gate controlled by a signal SEL delivered via a row conductor common to all the pixels of a given row and originating from the decoder DEC1; the drain of the selecting transistor is connected to the source (or made from the same diffusion as the source) of the read transistor; the source of the selecting transistor is connected to the column conductor CC that forms the output of all the pixels of a given column; the potential of the storage node is delivered to the column conductor when the pixel is selected by the signal SEL;

a gate for resetting the potential of the storage node, which gate is controlled by a resetting signal RST and is located between the storage node and a drain raised to a reference potential Vref;

and lastly, optionally, a gate for overall resetting of the potential of the photodiode, which gate is located between the photodiode and a drain raised to a reference potential that may be Vref; this gate, which is controlled by a signal GR, makes it possible to prevent the photodiode from accumulating charges, in order to define a desired charge integration time for all the pixels of the matrix.

The pixel $P_i$ delivers, to the column conductor CC:

first, a reset potential, after the node ND has been reset by the signal RST; and then, a useful signal potential, after charges have been transferred from the photodiode to the node ND by the signal TRA.

The order of these operations is important if a veritable correlated double sampling measurement allowing kTC type read noise to be minimized is to be obtained at the moment of sampling.

These two potentials are delivered, when the row of rank i has been selected by the decoder DEC1, to the sampling circuit of rank i, which is selected at the same time by the decoder DEC2.

Figure 3:
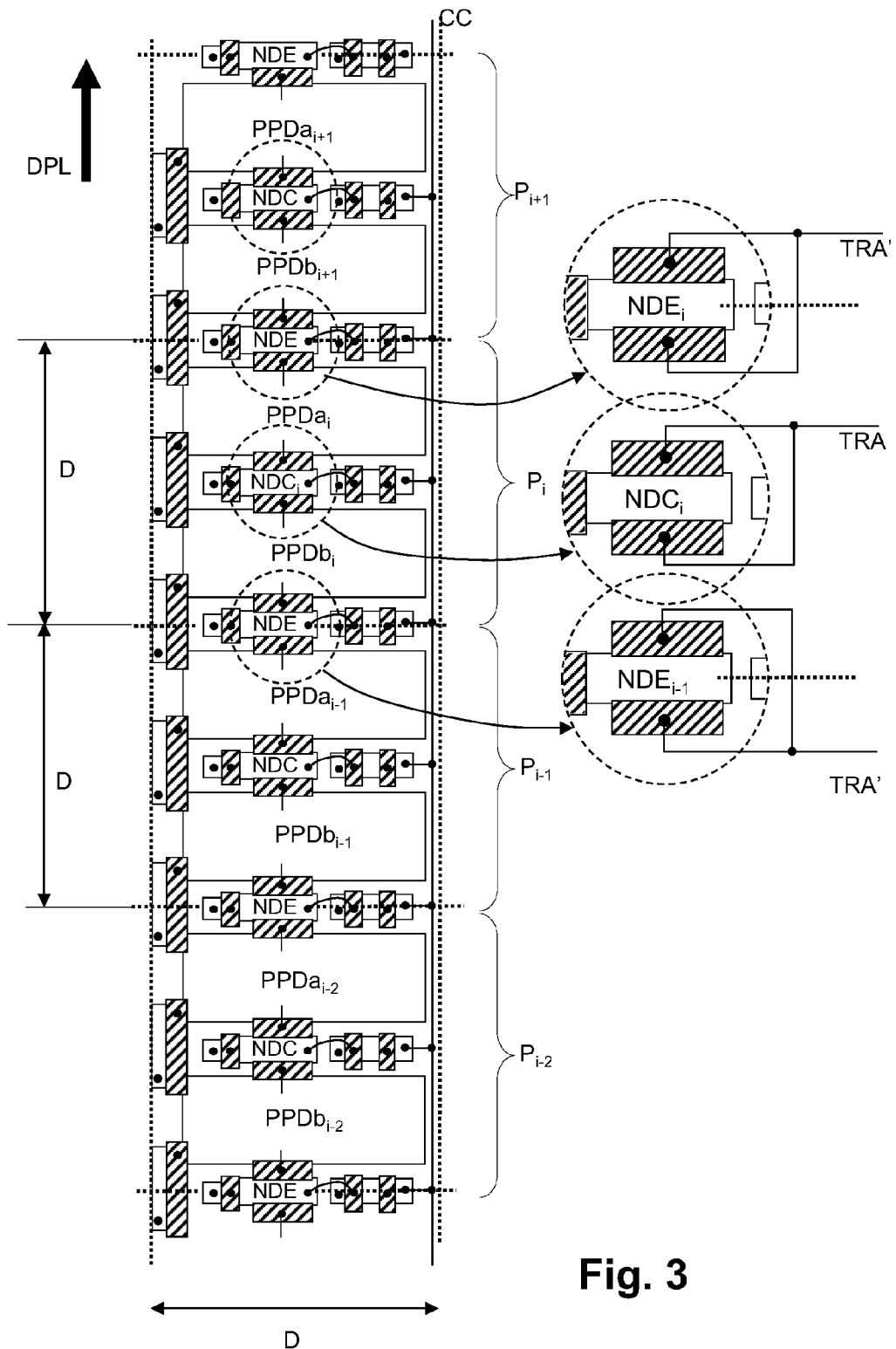
FIG. 3 schematically shows a column of pixels arranged according to the invention for a two-phase operating mode.

FIG. 3 shows a view of a column of pixels of a sensor according to the invention. This column forms part of a general structure according to FIG. 1, but the structure of the pixel is different from that in FIG. 2 and will be explained by comparison with the pixel in FIG. 2.

Here again the pixel has a generally square shape shown by the dotted lines, and the distribution pitch of the pixels is D, preferably both in the row-wise direction and in the column-wise direction. The duration of an integration and read out cycle of the charges of a pixel is Tp=D/V. In contrast, the pixel now comprises two photodiodes and three storage nodes: a downstream storage node, an upstream storage node and a central storage node. The downstream storage node is however shared with the pixel located immediately downstream, and the upstream storage node is shared with the pixel located immediately upstream so that, if there are N pixels in the column, there are in total 2N storage nodes in the column and not 3N. The upstream side and the downstream side are defined with reference to the direction of movement of the image, shown by the arrow DPL.

In FIG. 3, the pixel $P_i$ of rank i comprises a photodiode $PPDa_i$ and a photodiode $PPDb_i$, a central storage node $NDC_i$ located between the photodiodes but separated from each of them by a respective transfer gate, a downstream storage node $NDE_i$ that is the upstream storage node of the pixel $P_{i+1}$ located immediately downstream of the pixel $P_i$, and lastly an upstream storage node $NDE_{i-1}$ that is the downstream node of the upstream pixel $P_{i-1}$. Respective transfer gates allow the transfer of charges from the photodiode $PPDa_i$ either to the central node $NDC_i$ or to the downstream node $NDE_i$ to be controlled. Likewise, respective gates allow charges to be transferred from the photodiode $PPDb_i$ either to the central node $NDC_i$ or to the upstream node $NDE_{i-1}$. The gates corresponding to the central node are simultaneously controlled by a transfer signal TRA corresponding to an internal charge transfer inside the pixel; the gates corresponding to the external, downstream and upstream, nodes are controlled by a transfer signal TRA' that controls the transfer of charges originating from two different pixels to one and the same storage node, which node is a downstream node for one of the pixels and an upstream node for the other pixel.

The photodiodes shown here have rectangular surfaces in order to allow the two photodiodes, the central storage node, half the upstream and downstream storage nodes, the transfer gates and the other operating elements associated with each node to fit into the square of side D. These other elements (read transistor, selecting transistor, resetting gates and drains) have the same layout and the same functions as in the pixel in FIG. 2, as summarized below:

gates for resetting each storage node controlled by resetting signals;

read transistor having its gate connected to the storage node and its source connected to the column conductor CC;

row selecting transistor controlled by a selecting signal (n.b.: the storage nodes are selected individually, i.e. different selecting signals allow the potential of any storage node to be read); and optional gate for overall resetting of the potential of the photodiodes, controlled by a signal GR.

The principle of the invention is as follows: as in FIG. 1, a respective analog/digital conversion circuit $CONV_i$ of rank i is associated with each pixel of rank i; here, both a circuit for sampling the potentials to be converted and the actual analog/digital converter that converts the sampled potential (in fact a difference between two sampled potentials) into a digital value are grouped under the simplified designation "conversion circuit". In addition, as will be seen, it is preferable for the conversion circuit associated with a pixel to directly execute a digital addition function in order to add a result issued from a pixel in one periodic cycle and a result issued from another pixel in a preceding cycle. The function for adding N values issued from N different pixels that see the same image portion is in this case distributed to the various conversion circuits; therefore, the designation "conversion circuit" also will be understood to include this distributed addition function.

According to the invention, means for controlling the transfer gates and the sampling and conversion circuits are provided to establish the following periodic cycle, having two phases of equal duration; the period Tp corresponds to the movement of the image over a pitch D of the rows of pixels. The two phases partially overlap as will be seen below.

1. First Phase

The charges integrated by the two photodiodes during this phase are transferred to the central node $NDC_i$, then the charge on the central node is converted in the conversion circuit of rank i $CONV_i$ associated with the pixel of rank i, at the same time as the charge on the other central nodes is converted in the conversion circuits associated with the other pixels.

2. Second Phase a) the charges integrated during this phase by the first photodiode $PPDa_i$ of the pixel of rank i, and the charges integrated during this phase by the second photodiode $PPDb_{i+1}$ of the pixel of rank i+1 (pixel immediately downstream) are transferred to the downstream storage node $NDE_i$; likewise, the charges of the second photodiode $PPDb_i$ of the pixel of rank i and the charges of the first photodiode $PPDa_{i-1}$ of the pixel rank i-1 (upstream pixel) are transferred to the upstream node $NDE_{i-1}$;

b) next the charges present on the downstream node $NDE_i$ are converted in the conversion circuit $CONV_i$ of rank i; likewise, the charges present on the upstream node $NDE_{i-1}$, which is at the same time the downstream node of the pixel $P_{i-1}$, are converted by the conversion circuit $CONV_{i-1}$ of rank i-1.

The results of the conversion carried out by the conversion circuit of rank i during these two phases are accumulated in this circuit and are added to the result accumulated in the conversion circuit of rank i-1 at the end of the preceding cycle.

The digital addition in relation to the various pixels that have seen the same image portion is preferably carried out in the following way: the conversion circuit $CONV_i$ preferably comprises a ramp converter comprising a counter that counts at a given frequency for a length of time defined by the potential difference to be converted; the difference between the final content of the counter and the initial content represents a value analogous to this potential difference. The counters of the various conversion circuits are then connected so that the content of the counter of the circuit of rank i-1 is used as the initial contents of the counter of the circuit of rank i before the new conversion is triggered.

The digital accumulation of the conversion results of two phases is achieved by not resetting the content of the counter after the end of the first phase, i.e. by preserving as the initial content of the counter at the start of the second phase the content of the counter at the end of the first phase. The content of the counter at the end of the second phase represents the sum of the conversion results of the two phases.

Figure 4:
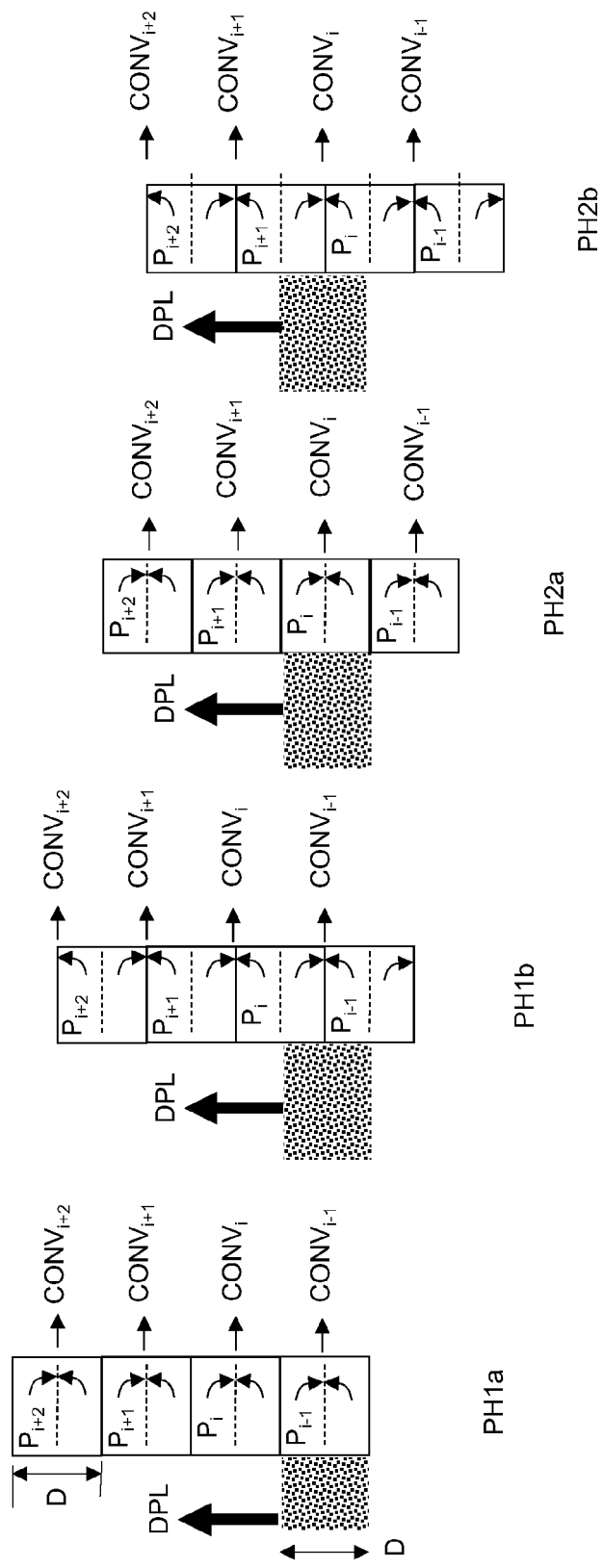
FIG. 4 shows a succession of image captures for the sensor according to the invention for an operating mode employing periodic cycles of two phases.

FIG. 4 illustrates the process just described. This figure shows the way in which the charges of the photodiodes of the pixels are alternatively directed toward the central node then toward the downstream and upstream nodes so that in the second phase charges are added originating from those of the photodiodes that have seen the same image portion as in the first phase even though the image has moved D/2 between the two phases.

Four steps are shown and correspond, respectively, to the end of each phase PH1a, PH1b, PH2a, PH2b of two successive cycles during which the image moves two times the pitch D in front of an image line of width D. The pixels are represented by adjacent squares of width D; the downstream and upstream storage nodes are represented by the boundary line between two squares; the central storage nodes are represented by a horizontal dashed line in the middle of the square. The image line is represented, in a fixed position, by a speckled zone of width D (width being measured in the direction of the movement); the relative movement of the pixels of the sensor with respect to the image takes place from downstream to upstream (from top to bottom in the figure) in front of this strip. The speckled image line is shown beside the sensor in order to keep the figure legible.

The curved arrows represent the transfer of charges first to the central nodes (first phase PH1a, PH2a of each of the cycles) then to the downstream and upstream nodes, i.e. the nodes between two pixels (second phase PH1b, PH2b of the cycles).

The conversion circuit numbers shown to the right of the pixels, opposite the position of each storage node, indicate which circuit receives the potential corresponding to each node in order to sample and convert it. It may be seen that:

the converter of rank i-1 first converts (PH1a) from the central nodes the charges accumulated by the two photodiodes of the pixel $P_{i-1}$, then converts (PH1b) from the downstream node the charges issued from the downstream photodiode of the pixel $P_{i-1}$ and the upstream photodiode of the pixel $P_i$; therefore, in the second phase use is made of a group of two photodiodes that have seen the same image line as those of the first phase;

in the following cycle PH2a, PH2b the same thing is done, but if the same image line is considered it is with the pixel Pi and the converter $CONV_i$ that the operations begin; this is why the second cycle must add the results of the conversion performed by the conversion circuit $CONV_i$ (associated with the pixel $P_i$) to the results of the conversion performed in the preceding cycle by the conversion circuit $CONV_{i-1}$.

Figure 5:
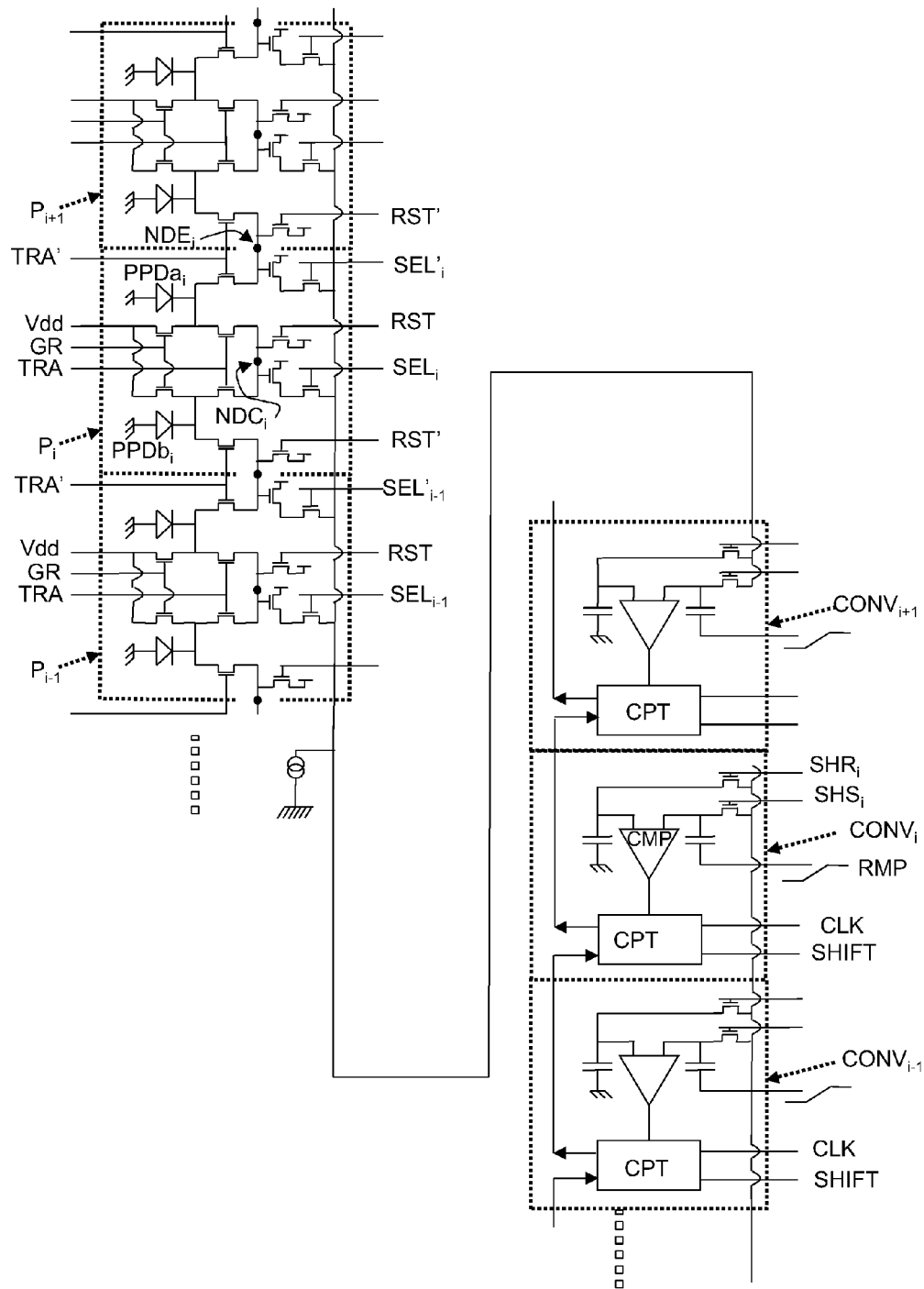
FIG. 5 shows a circuit diagram of pixels in a column, each pixel being associated with a respective analog/digital conversion circuit.

FIG. 5 shows a column of pixels (three pixels in succession $P_{i-1}$, $P_i$, $P_{i+1}$) with the conversion circuits associated with these pixels ($CONV_{i-1}$, $CONV_i$, $CONV_{i+1}$). A column conductor CC connects the outputs of all the pixels and transmits the potentials of the storage nodes to the conversion circuits. The pixels are represented in the form of electrical circuits and correspond to the physical description given with regard to FIGS. 2 and 3.

The configuration described below assumes that the read out is a correlated double sampling read out in which the following operations are carried out in order: resetting of the storage node, sampling of the reset level, then transfer of charges from the photodiodes to the storage nodes and lastly sampling of the useful potential level representing the charges.

Moreover, in the embodiment in FIG. 5, the conversion circuit of rank i comprises:

two sampling capacitors, one for storing a reset potential level under the control of a first sampling signal $SHR_i$, the other for storing a useful potential level under the control of a second sampling signal $SHS_i$; the signals $SHR_i$ and $SHS_i$ are emitted in sync with the connection, by a signal $SEL_i$ or $SEL'_i$, of a storage node ($NDC_i$ or $NDE_i$) with the column conductor;

a linear voltage ramp generator that may be common to all the conversion circuits and that delivers a voltage ramp RMP; this ramp is applied to a terminal of the second capacitor;

a comparator CMP the inputs of which are connected to two capacitors, which comparator initially has a first state at the start of conversion and which switches to a second state when the potential on its second input reaches, under the influence of the ramp applied to the second capacitor, the potential on its first input; and a counter CPT that counts pulses at a set frequency from the start of the ramp and that stops counting under the control of the comparator when the comparator switches; for the sake of simplicity a clock signal CLK has been shown, but it must be understood that it permits counting only from the start of the voltage ramp RMP.

The content of the counter is incremented during the voltage ramp by a value that represents the difference between the reset potential and the useful potential. However, as will be seen below, the initial contents of the counter may be set from the final contents (in the preceding cycle) of the counter located upstream, in order to sum directly in the conversion circuit $CONV_i$ of rank i a current result and the contents obtained in the counter of the circuit of preceding rank $CONV_{i-1}$ at the end of the preceding cycle. Thus, the contents of the counter at the end of an Nth cycle represents the sum of the results of the conversion of the charges collected in N pixels having seen the same image portion during N successive read out cycles. A signal SHIFT permits the result of the converter $CONV_{i-1}$ to be transferred to the counter of the converter $CONV_i$.

The central storage node of the pixel $P_i$ may be connected to the column conductor by a row selecting conductor $SEL_i$. The downstream storage node $NDE_i$ may be selected separately by a row selecting conductor $SEL'_i$. The central storage nodes $NDC_i$ may all be reset simultaneously by a signal RST, and likewise the downstream and upstream storage nodes may all be reset simultaneously by a signal RST'. The charges may be transferred from two photodiodes of a pixel to the central node $NDC_i$ by a signal TRA common to all the pixels; likewise, the charges may be transferred from two photodiodes to the downstream and upstream nodes by a signal TRA' common to all the pixels.

A signal GR common to all the pixels allows the potential of all the photodiodes to be reset after a chosen integration duration.

The fact that the transfer signals TRA and TRA' are common to all the pixels makes it possible to work in a global shutter operating mode, which is advantageous because all the pixels are illuminated simultaneously for the same integration duration and not for periods of time staggered depending on the rank i of the row of pixels. The fact that the global resetting signal GR is common to all the pixels in addition allows the common integration duration to be adjusted.

The circuit in FIG. 5 functions in the following way, explained with reference to the timing diagram in FIG. 6, which shows the two phases PH1a and PH1b, then PH2a, PH2b of two measurement cycles of period Tp.

The following signals are shown:
TRA, which controls the transfer of charges from the photodiodes to the central nodes with a periodicity Tp, and TRA', which controls the transfer to the downstream and upstream nodes, also with a periodicity Tp, the signals TRA' being shifted by Tp/2 relative to the signals TRA;
RST and RST' zeroing signals, of periodicity Tp, shifted by Tp/2 relative to each other;
GR, optional, of periodicity Tp/2, the end of the signal GR having the same position in time relative to the end of the signal TRA and relative to the end of the signal TRA';
$SEL_1$ to $SEL_N$, signals for selecting rows 1 to N, the central storage nodes being connected to the column conductor CC during these signals, whether this is for a measurement of reset potential or for a measurement of illumination potential;
$SEL'_1$ to $SEL'_N$, successive signals for selecting rows 1 to N, the downstream storage nodes being connected to the column conductor during these signals, here again for a measurement of reset potential or for a measurement of useful potential;
$SHR_1$ to $SHR_N$, signals for sampling reset potential levels to the first capacitor of the respective conversion circuits $CONV_1$ to $CONV_N$; these signals are produced in correspondence with the row selecting signals: the signal $SHR_i$ of the circuit $CONV_i$ is emitted when the signal $SEL_i$ has selected the central nodes of the row of rank i, and it is once more emitted when the signal $SEL'i$ has selected the downstream nodes of this row; sampling of reset levels (to the same capacitor) therefore takes place two times per cycle in each conversion circuit;
$SHS_1$ to $SHS_N$, signals for sampling illumination potential levels to the second capacitor of the respective conversion circuits $CONV_1$ to $CONV_N$; these signals are also produced in correspondence with the row selecting signals: the signal $SHS_i$ of the circuit $CONV_i$ is emitted when the signal $SEL_i$ has selected the central nodes of the row of rank i, and it is once more emitted when the signal $SEL'i$ has selected the downstream nodes of this row; sampling of useful potential levels (to the same capacitor) therefore takes place two times per cycle in each conversion circuit;
CONV: conversion control signal, delivered simultaneously to all the conversion circuits after the sampling signal $SHS_N$ of the last row; the conversion control signal triggers the voltage ramp and counting by the counters; conversion takes place two times per cycle, first after sampling of the useful potentials of all the central nodes, then after sampling of the useful potentials of the downstream nodes; and
lastly, the signal SHIFT common to all the converters, which permits transfer of the contents of the converter of rank i−1 to the counter of the converter of rank i, in order to initialize this counter at a value that represents a running total of the conversion results of the rows of rank 1 to i−1 that have seen the same image portion as the converter of rank i; the conversion will produce a result that will be added to this initial contents.

The duration of charge integration inside each phase is either Tp/2 or a duration Tint/2 smaller than Tp/2 and adjustable by adjustment of the position of the signal GR when this signal is used. The end of the signal GR defines the start of the integration duration for all the pixels. The end of the pulses TRA and TRA' defines the end of the integration duration of the first and second phase, respectively, since these signals empty the contents of the photodiodes into the storage nodes. When the signal GR is not used, the end of the pulse TRA or TRA' also defines the starting point of a new integration duration.

The periodic two-phase cycle proceeds in the following way:

First Phase PH1a
a) charge integration in the photodiodes during a duration Tint/2; during this duration, the converters convert the signals sampled in the preceding phase;
b) toward the end of the integration duration Tint/2, when the signals of the preceding cycle have been converted, the signal SHIFT transfers the results accumulated in the counters of rank i−1 to the counters of rank i, for all the conversion circuits, in order to initialize the counters depending on these results before a new conversion;
c) toward the end of the integration duration, before or during or after the signal SHIFT, a global signal RST is emitted to reset the potential of all the central storage nodes;
d) after the signal RST, the central storage nodes of rows 1 to N are selected in succession by the signals $SEL_1$ to $SEL_N$; the column conductor receives each time a respective reset potential and the sampling signals $SHR_i$ to $SHR_N$ sample these potentials each time to the first capacitor of the corresponding converter; the signals SEL', remain inactive:

e) the signal TRA is emitted and transfers the charges of all the photodiodes to the central nodes; the control signal TRA' remains inactive;

f) after the signal TRA, the central storage nodes of rows 1 to N are once more selected in succession by the signals $SEL_1$ to $SEL_N$; the column conductor receives each time a useful potential representing the charges stored in a central storage node; the sampling signals $SHR_1$ to $SHR_N$ sample these useful potentials each time to the second capacitor of the corresponding converter; the signals $SEL'_i$ remain inactive; the useful potentials are therefore sampled after charges have been transferred to nodes the reset potential of which was sampled beforehand, thereby enabling veritable correlated double sampling; and g) after all the reset potentials and useful potentials have been sampled, the conversion control signal CONV is applied to all the converters simultaneously; this control signal triggers the voltage ramp and the counting of the counters; the amount the counter increments by depends on the potential differences sampled to the converter.

Steps f and g are considered above and below to form part of the phase PH1a because they relate to charges integrated during the phase PH1a, however these steps continue after the second phase PH1b has started, i.e. after integration of charges in the photodiodes restarts after the end of the transfer signal TRA. The two phases are therefore identical but overlap somewhat.

Second Phase PH1b

The second phase proceeds in the same way but concerns downstream nodes and not the central nodes. Therefore, in the second phase, the signal TRA becomes inactive and is replaced by the signal TRA'; the signals $SEL_1$ to $SEL_N$ become inactive and are replaced by the signals $SEL'_1$ to $SEL'_N$.

Furthermore, in contrast to the first phase, the signal SHIFT is not emitted, i.e. the counters are not reset. They retain the result that they acquired at the end of the conversion of the charges integrated in the first phase; conversion of the charges generated in the second phase PH1b therefore increments the counters from the result obtained in the first phase. It is only after the end of this second conversion that the signal SHIFT will once more be emitted.

The conversion circuits of rank N $CONV_N$ accumulates the results of the illumination seen by the N conversion circuits in N successive cycles and corresponding to the same image portion. They deliver an overall measurement result. This result is output with the periodicity Tp.

The structure according to the invention generates less noise than that that would be produced by a conventional structure in which each of two adjacent photodiodes always transfer their charges to their own storage node. Specifically, the transfer in the structure of the invention adds charges noiselessly and the digital summations that generate noise are carried out only after this analog charge summation.

In the above, the downstream storage node and the central storage node were each considered to be associated with a reset transistor, a read transistor and a row selecting transistor. This is why the downstream node required a row selecting signal $SEL'_i$ that was different from the row selecting signal $SEL_i$ of the central node. However, a slightly different solution may also be envisioned: while still providing different storage nodes flanking each photodiode, and separate signals TRA and TRA' as described above, provision may be made for the two nodes to be electrically connected via an electrical conductor (this conductor making contact with the two nodes that are in practice n-type diffusions in the integrated circuit).

Figure 7:
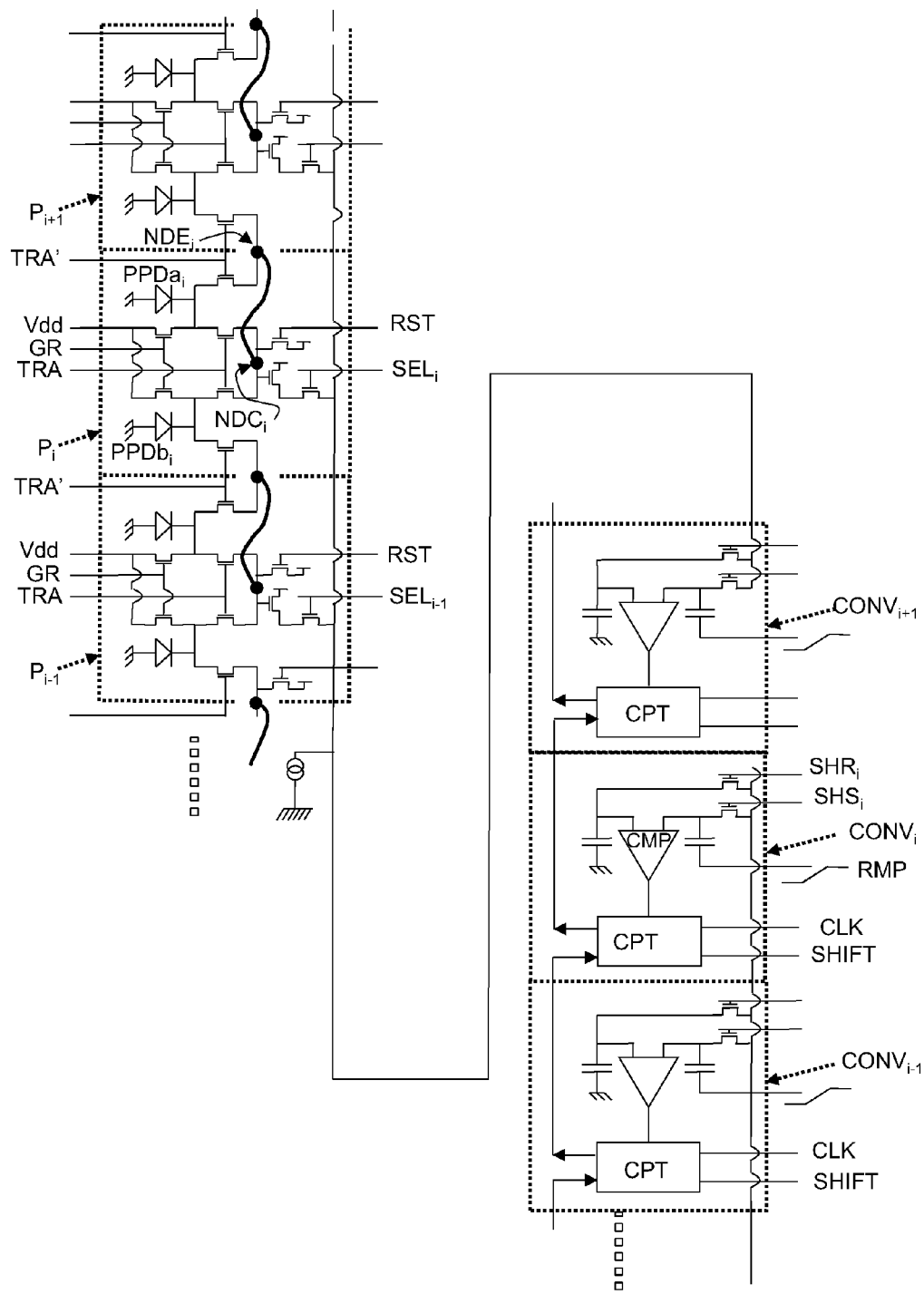
FIG. 7 shows a circuit diagram in a variant embodiment where the two storage nodes of a pixel are electrically connected.

This variant embodiment is shown in FIG. 7 in which the central nodes $NDC_i$ and downstream nodes $NDE_i$ are shown connected by a conductor.

The two physically different nodes, one of which will receive charges but not the other, then become, electrically speaking, a common node in the sense that they are reset simultaneously, then read simultaneously.

In the phase PH1a, the two nodes are simultaneously reset by a single reset transistor controlled by a single signal RST; their common reset level is sampled (signal $SEL_i$ and simultaneously signal $SHR_i$); next, the charges of the two photodiodes are transferred to a node by the signal TRA (here it is the central node that receives the charges from the two photodiodes that flank this node); in the phase PH1 b, charges continue to be integrated in the photodiodes and are then transferred once more to the common node, without intermediate resetting, by the signal TRA' (here it is the downstream node that receives charges from the two photodiodes that flank it). The charges received in these two phases are added analogously (noiselessly) in the common storage node and are digitized only after this addition. A single conversion is therefore carried out in each period Tp, thereby reducing noise and relaxing the constraints on the speed of the converters.

The potential resulting therefrom on the common node is applied to the column conductor by the read transistor and the selecting transistor ($SEL_i$) common to the two connected nodes; this potential is sampled by the pulse $SHS_i$ simultaneously with $SEL_i$. There is no selecting conductor $SEL'_i$.

Figure 6:
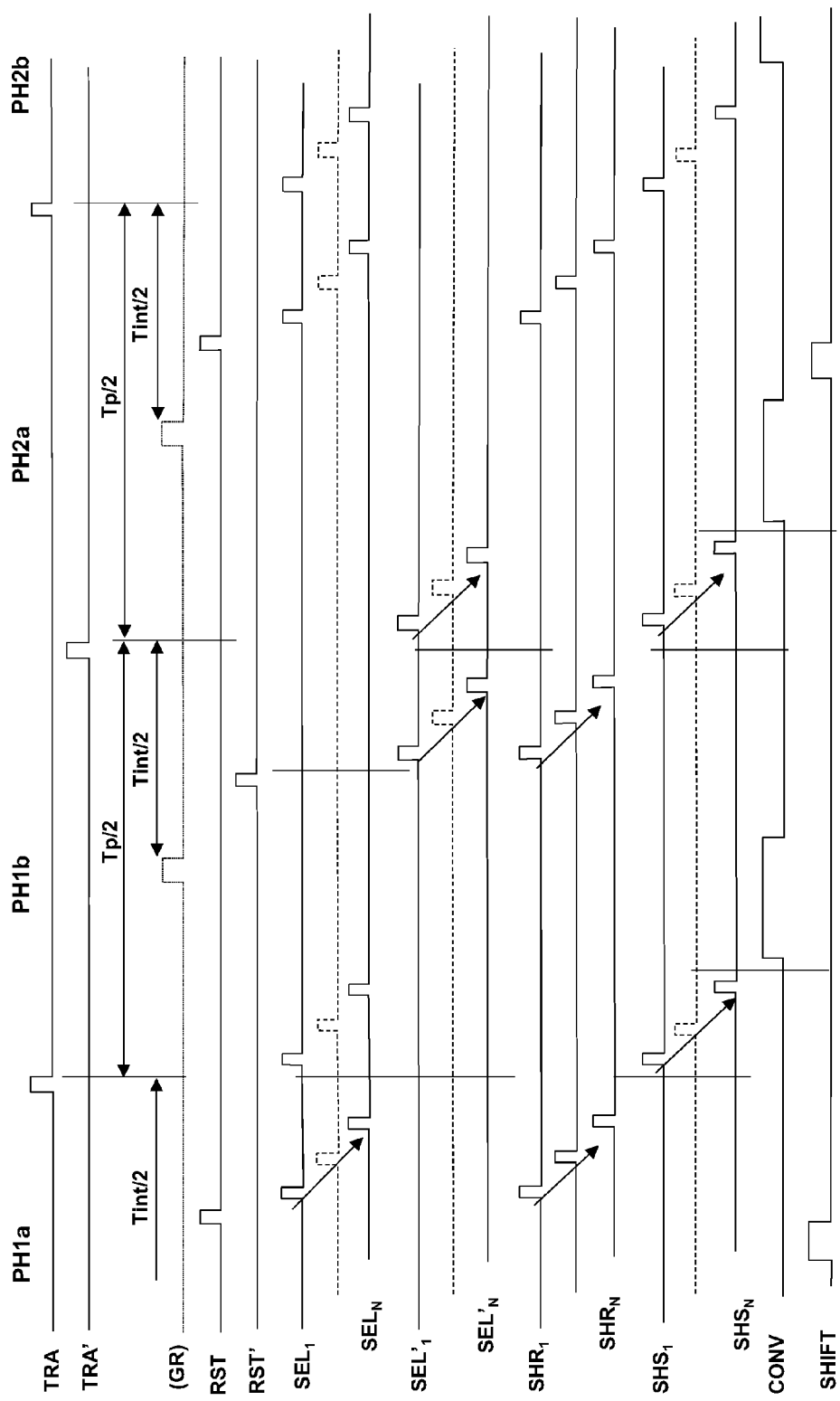
FIG. 6 shows a timing diagram of the operation of the sensor in FIGS. 3 to 5.
Figure 8:
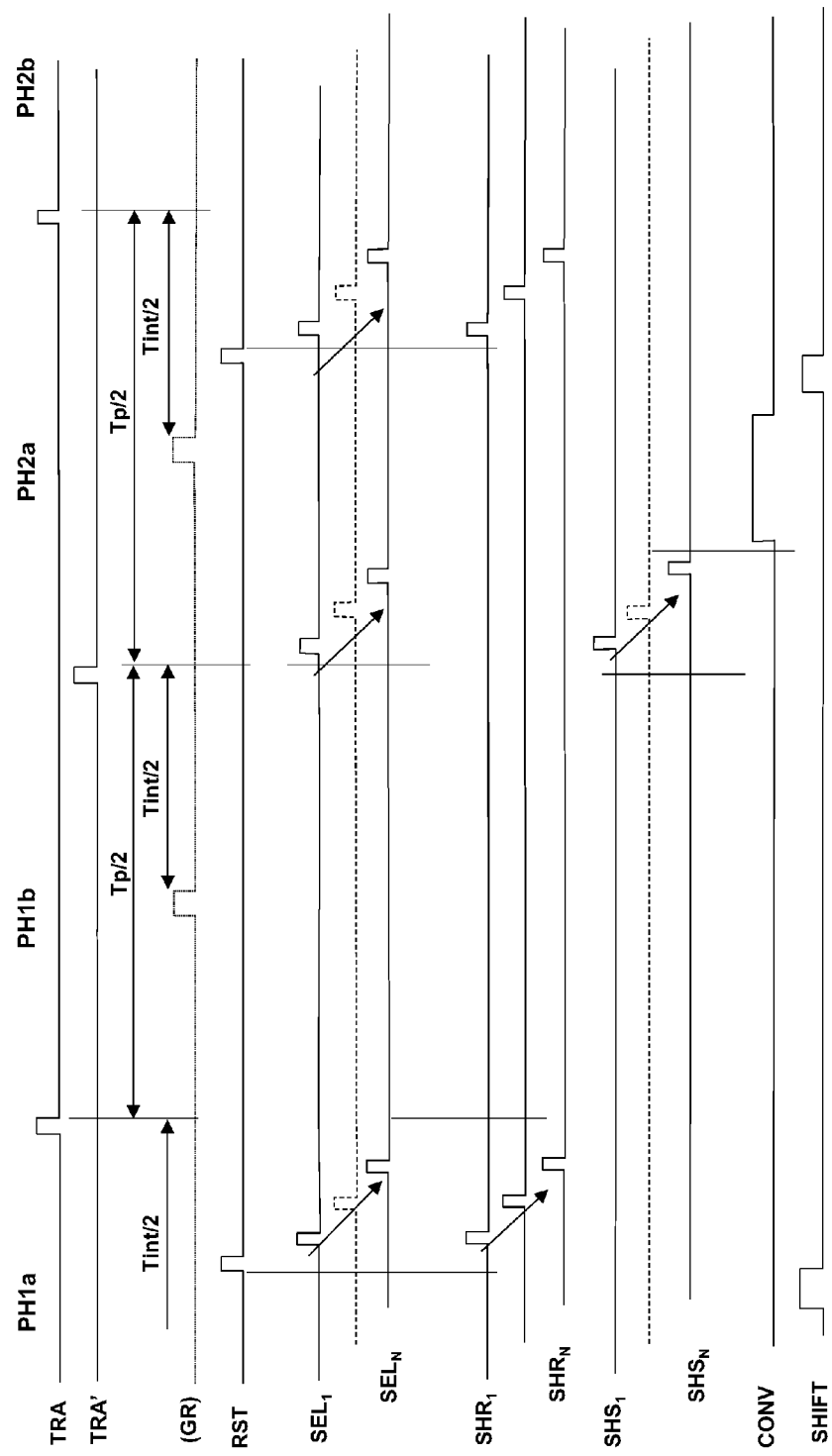
FIG. 8 shows a timing diagram of the operation of the sensor in FIG. 7.

In this embodiment, the timing diagram is that in FIG. 8; the differences with respect to FIG. 6 are the following:
  there is only one resetting signal RST of periodicity Tp/2, before the signal TRA but not before TRA';
  the signals SHR and SHS that follow the signal have a periodicity of Tp and not Tp/2, the signals SHR following the pulse RST and preceding the signal TRA, the signals SHS following the pulses TRA';
  the signals $SEL_1$ to $SEL_N$ our synchronous with the signals $SHR_1$ to $SHR_N$, respectively, and with the signals $SHS_1$ to $SHS_N$; there are no signals SEL'; and
  the conversion pulses have a periodicity Tp and not Tp/2 and follow the last signal $SHS_N$.

Here again, a global shutter operating mode having an adjustable integration duration and a veritable correlated double sampling read out is possible.

The description of FIGS. 3 to 8 relates to a sensor operating periodically with two phases; however it is also possible to envision a larger number of phases. The pixel of generally square shape is divided into a larger number of photodiodes, with a plurality of central storage nodes between the photodiodes of the pixel, and furthermore a downstream storage node shared with the downstream pixel and an upstream storage node shared with the upstream pixel.

It is then necessary for the conversion circuits to be capable of sampling a plurality of storage node reset potential values and a plurality of useful potential values in a given phase; the circuits carry out multiple conversions in each conversion step (there is one conversion step in each phase). More precisely, if there are P phases it is necessary to sample, during a phase, P-1 reset levels and P-1 useful levels and to convert P-1 potential differences separately; the results of the P-1 conversions are added digitally.

For example, if there are three phases, there are three photodiodes in each pixel, one shared downstream storage node, one shared upstream storage node, and two central storage nodes that may be referred to as the downstream central node and the upstream central node.

The use of the storage nodes is then circularly permutated allowing charges to be transferred from a photodiode in a direction that tends to transfer, to a group of nodes that varies in each phase, the charges of the photodiodes that see the same image portion during these phases. P−1 nodes are used, a Pth node is not used and this node is circularly permutated.

The modulation transfer function, which increases from 0.64 to 0.90 when two phases are used instead of one, is even further improved and reaches 0.95 with three phases.

A four-phase structure could also be used, which would further improve the modulation transfer function, but the improvement obtained becomes less and less significant as the number of phases increases. With four phases the theoretical value of the function is 0.97 and therefore the improvement obtained is only about 2%.

Figure 9:
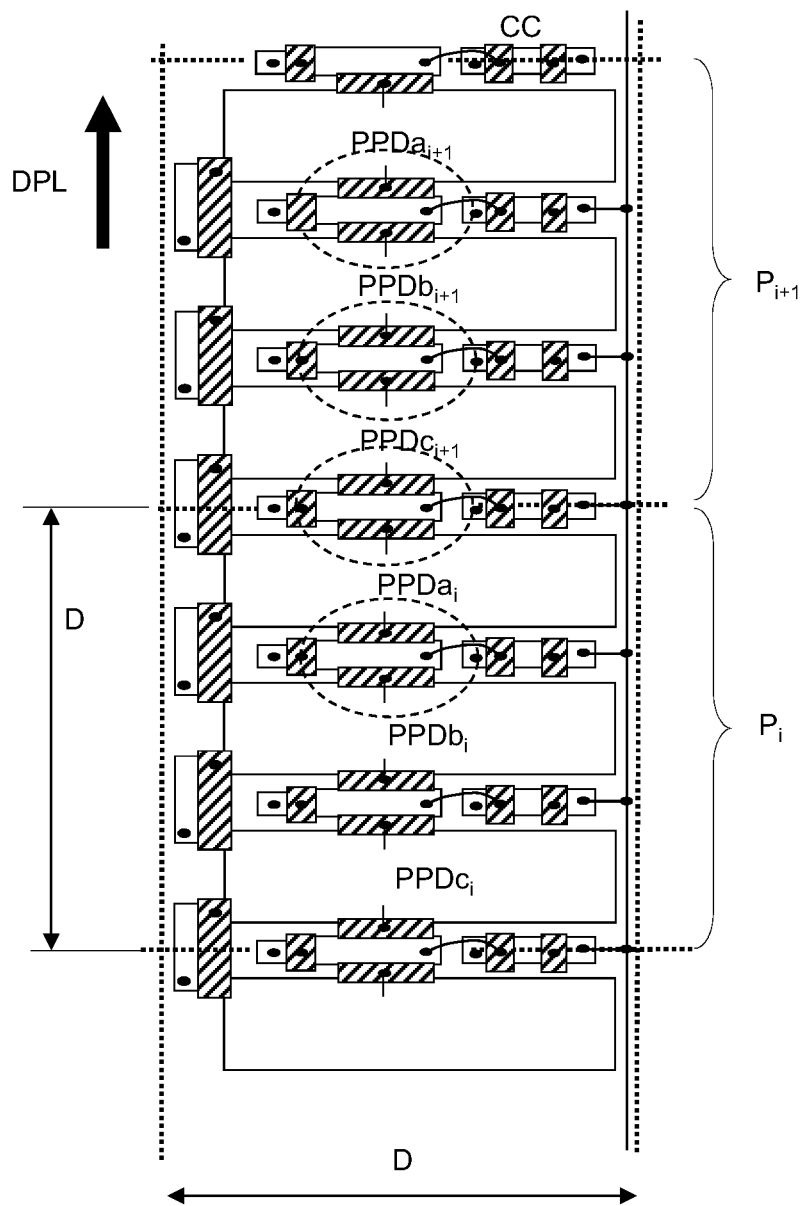
FIG. 9 shows a pixel structure for a three-phase operating mode.
Figure 10:
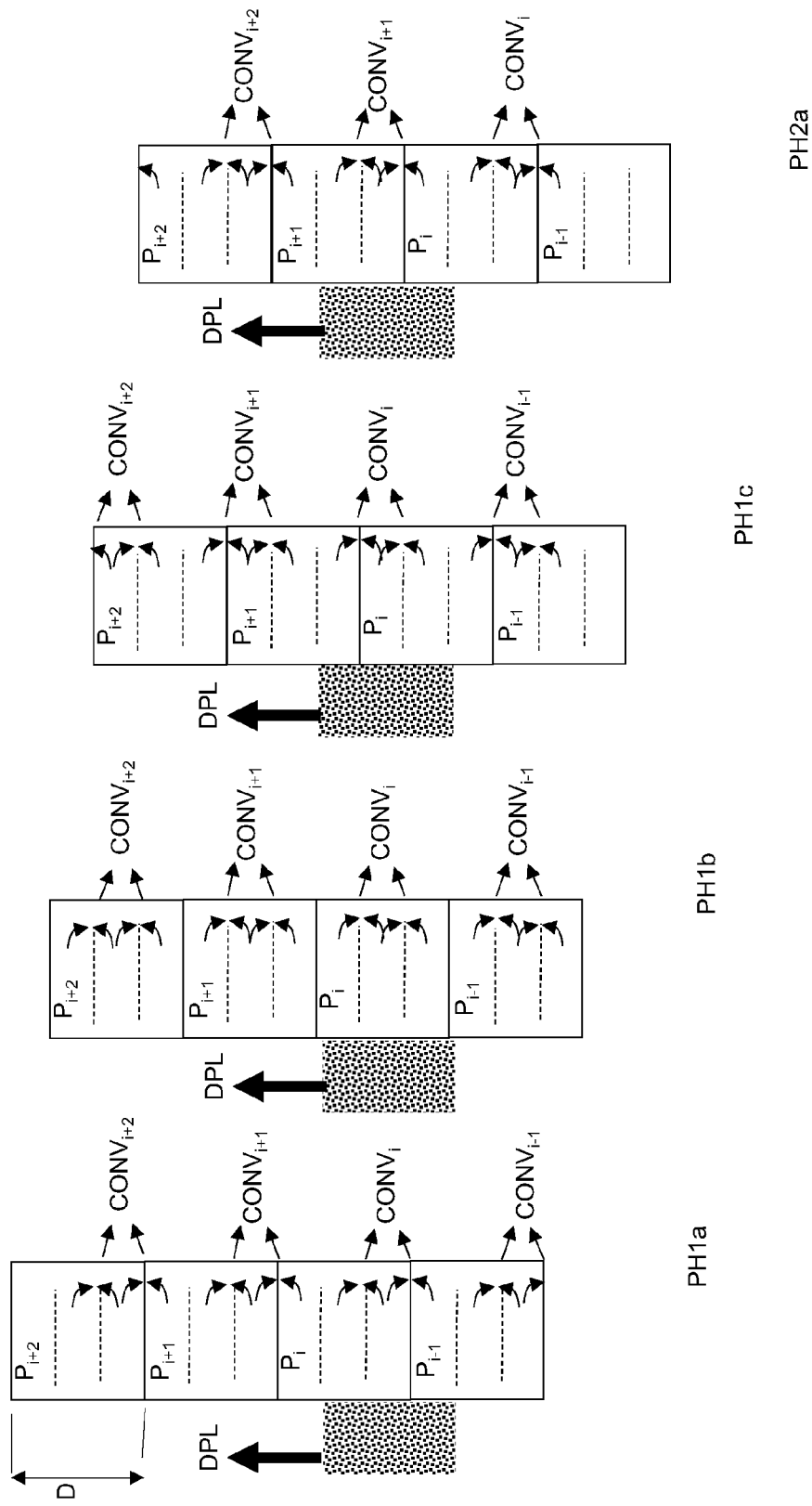
FIG. 10 shows a schematic of image capture in a three-phase cycle.

FIG. 9 shows a structure for three phases, with three photodiodes $PPDa_i$, $PPDb_i$, $PPDc_i$ per pixel of generally square shape. FIG. 10 shows, following the same principle as FIG. 4, a schematic of image capture in three phases PH1a, PH1b, PH1c, showing the circular permutation, from upstream to downstream, of the unused node.

Figure 11:
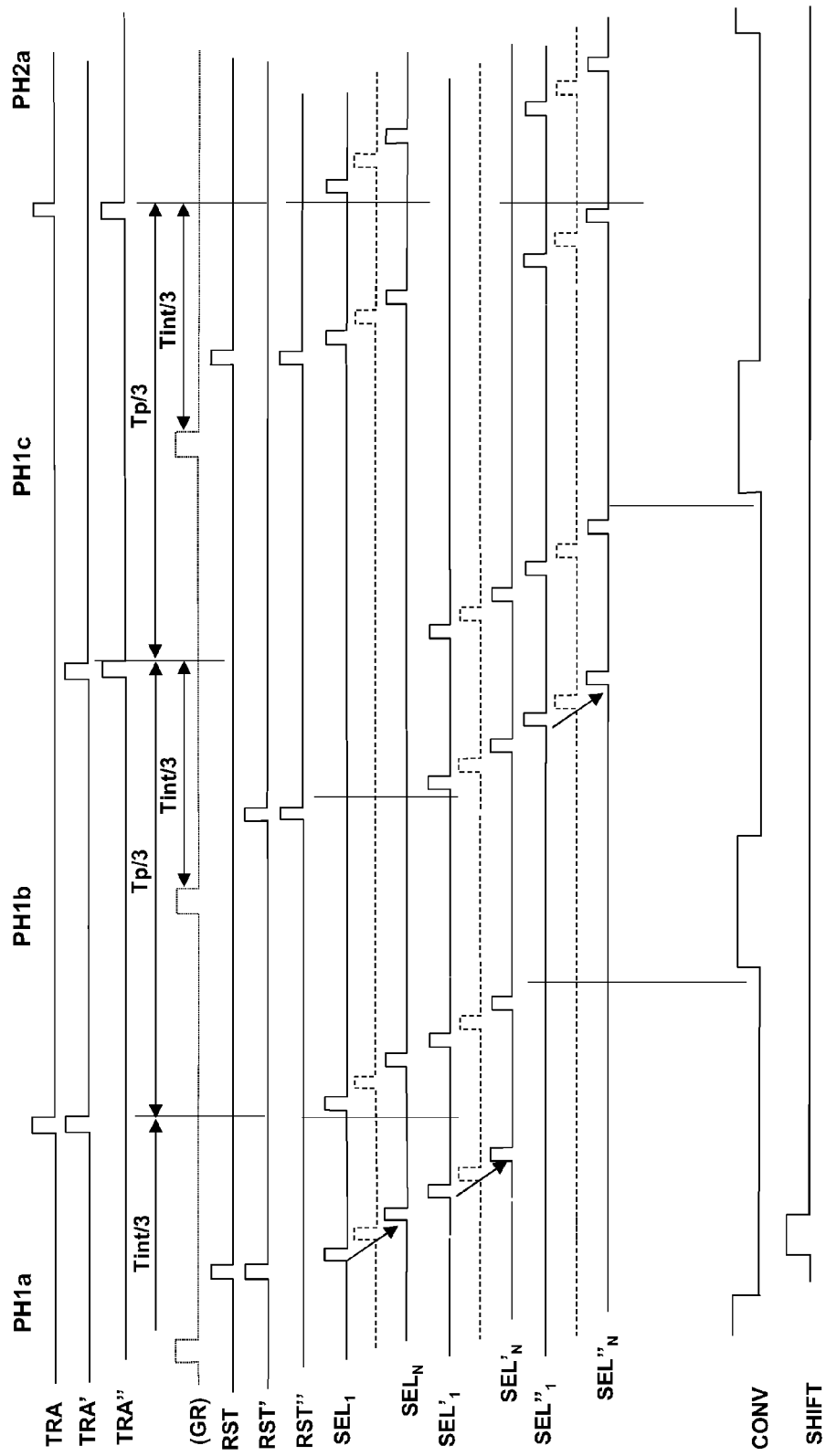
FIG. 11 shows a timing diagram of the operation of the structure in FIG. 9.

FIG. 11 shows the timing diagram of three-phase operation, involving transfer signals TRA, TRA' and TRA", associated with each of the three storage nodes of a pixel and common to all the pixels, resetting signals RST, RST' and RST" associated with each of the nodes of a pixel and common to all the pixels, and row selecting signals SEL, SEL' and SEL" associated with each of the nodes of a pixel and specific to each pixel from 1 to N. The sampling signals SHR and SHS are not shown in order not to complicate the figure; they are synchronized with the row selecting signals and it will be understood that two series of samplings and two series of conversions are carried out in each phase since two storage nodes in three receive charges from adjacent photodiodes in each phase. These samplings are taken in succession if there is only one column conductor. The conversion signal CONV is the signal controlling simultaneous conversion of two analog potential differences. It is repeated in each phase, therefore with a periodicity Tp/3. The signal SHIFT initializes the counters of the conversion circuits to the contents of a counter of preceding rank at the end of the preceding cycle. It is emitted with the periodicity Tp.

In each phase there are two simultaneous resetting signals, the third being inactive, and a circular permutation takes place when the phase changes. Likewise, there are two simultaneous transfer signals the third remaining inactive. As regards the row selecting signals, they cannot be simultaneous if there is only one column conductor, and in this case they succeed each other: a series of signals $SEL'_1$ to $SEL'_N$ succeeds a series $SEL_1$ to $SEL_N$. Here again each phase uses two series of signals, for example $SEL_1$ to $SEL_N$ and $SEL'_1$ to $SEL'_N$, the third being inactive, and a circular permutation is carried out for the other phases.

For a pixel of rank i read by a conversion circuit of rank i:

Phase 1: first the upstream node and the upstream central node of a pixel of rank i are reset; the two reset potentials are sampled row by row; next, the transfer of charges from the photodiodes to these two nodes is permitted (the charges of the photodiode that is between the two nodes are shared between the two nodes); the useful potentials of these nodes are sampled row by row; two potential differences are converted simultaneously or successively in a conversion circuit of rank i that has been initialized beforehand from the preceding pixel that saw the same image portion; the downstream central node is not used and does not receive charges.

Phase 2: the two central nodes are reset; the two reset potentials are sampled to the same conversion circuit, which is not reset after phase 1; the transfer of charges from the photodiodes to the two nodes in question is then permitted (the charges of photodiodes adjacent these two nodes are shared); once more, two sample differences are sampled to and converted in the conversion circuit; the upstream node remains unused.

Phase 3: the same but the downstream central node and the downstream node are used; the upstream central node is not used. The node that is not used therefore undergoes a circular permutation.

After phase 3, the counting results accumulated in the converter of rank i are transferred, simultaneously for all the pixels, to the counters of the converter of rank i+1, in order to obtain the required running total.

Thus, during the first phase PH1a, if three adjacent storage nodes of index i are considered:

the reset level of a first storage node, obtained following the signal RST, is sampled to a sampling capacitor during a first selecting pulse $SEL_i$;

next, the reset level of a second node, obtained following the signal RST', simultaneous with RST, is sampled to another capacitor during a selecting pulse $SEL'_i$;

next the useful levels are stored (after the simultaneous transfer pulses TRA and TRA') in two other capacitors during another pulse $SEL_i$ and another pulse $SEL'_i$; and next, two analog/digital conversions are carried out on the basis of the samples stored in the four capacitors.

In the following phase the process restarts with the second and third storage nodes, using resetting signals RST' and RST" instead of RST and RST', selecting signals SEL' and SEL" instead of SEL and SEL', and simultaneous transfer signals TRA' and TRA" instead of TRA and TRA', etc.

And likewise for the third phase, via circular permutation.

The counters are reset only on each new periodic cycle of three phases, here before the conversion of the charges integrated in the phase PH1a.

It will be noted that the image sensor according to the invention has a structure that can function in two directions, i.e. the direction of movement of the image may be reversed without losing the benefit of TDI operation; it is then for example necessary to make provision for reversal of the connections of the counters, or even for the pixel of rank i to be associated with the converter of rank N−i.

It may also be chosen to accumulate the charges over a number of pixels n smaller than N if it is so desired. It is then necessary to zero the counters after n periods and to read the result of output from the nth counter.

The invention claimed is:

1. A time-delay and charge summation image sensor the charge summation of which is synchronized with a relative movement between the sensor and an image, which sensor comprises N rows of pixels distributed with a pitch D, each pixel of rank i in a column comprising first and second photodiodes ($PPDa_i$, $PPDb_i$) arranged in succession in the direction of the movement, and three charge storage nodes separated from the photodiodes by charge transfer gates, among which a central node located between said first and second photodiodes, and two other nodes shared with adjacent pixels, which nodes are a downstream node located between the first photodiode of a pixel of rank i and the second photodiode of a pixel of rank i+1 located immediately downstream of the pixel of rank i, and an upstream node located between the second photodiode of the pixel of rank i and the first photodiode of a pixel of rank i−1 located immediately upstream of the pixel of rank i, the sensor furthermore comprising:

a respective analog/digital conversion circuit of rank i associated with each pixel of rank i; and means for controlling the transfer gates and the conversion circuits in order to transfer charges from a photodiode to one or other of the storage nodes adjacent to said photodiode, then to convert said charges, in a periodic cycle of period Tp where Tp is a time it takes the image to move a distance equal to the pitch of the rows of pixels, in two phases such that:
at the end of a first phase the charges of the two photodiodes are transferred to the central node; and
at the end of a second phase of duration Tp/2, the charges of the first photodiode of the pixel of rank i and the charges of the second photodiode of the downstream pixel of rank i+1 are transferred to the downstream node, then the charges present in the downstream node are converted in the conversion circuit of rank i associated with the pixel of rank i; and
means for accumulating, in the conversion circuit of rank i, the results of the one or more conversions carried out during a two-phase cycle with the result accumulated beforehand in the conversion circuit of rank i−1 at the end of the preceding cycle.

2. The image sensor as claimed in claim 1, wherein the pixel has a generally square shape.

3. The image sensor as claimed in claim 1, wherein selecting means are provided for selecting independently of each other the central node or the downstream node in order to read the charges that are contained thereon, and wherein at the end of the first phase, after the charges have been transferred to the central node, the charges on this node are converted in the conversion circuit of rank i associated with the pixel of rank i.

4. The image sensor as claimed in claim 1, wherein the central node and the downstream node are electrically connected by a conductor so as to form an electrically common node, and wherein the charges contained on the electrically common node are converted in the conversion circuit of rank i only at the end of the second phase but not at the end of the first phase.

5. The image sensor as claimed in claim 4, wherein means for resetting the common node are provided in order to reset this node during the first phase before charges are transferred to the central node, but not during the second phase.

6. The sensor as claimed in claim 1, wherein the analog/digital conversion circuits each comprise a counter the contents of which is incremented proportionally to the analog value of the signal to be converted, and the contents of the counter corresponding to the pixel of rank i is set, at the start of a periodic two-phase cycle, but not between two phases of the same cycle, to a value that is the result accumulated by the counter of the conversion circuit of the preceding rank i−1.

7. A time-delay and charge summation image sensor the charge summation of which is synchronized with a relative movement between the sensor and an image, which sensor comprises N rows of pixels distributed with a pitch D, each pixel, of generally square shape, comprising P, P being an integer higher than 2, photodiodes that are arranged in succession in the direction of the movement of the sensor in front of the image, having charge storage nodes between the photodiodes of the pixel and between the photodiodes of adjacent pixels in a given column of pixels, and having transfer gates between the photodiodes and the storage nodes, the storage nodes possibly being connected to a column conductor and to as many analog/digital conversion circuits as there are pixels in a column, each conversion circuit being able to carry out P−1 simultaneous analog/digital conversions in each phase, these conversions corresponding to the charge on P−1 storage nodes, the transfer gates being controlled so as to transfer the charges from one photodiode either to a storage node located downstream of the photodiode or to a node located upstream in a periodic cycle of period corresponding to the time taken for the image to move a distance D, the cycle comprising P phases of equal duration, the control of the gates being such that in each phase there is a storage node that does not receive charges from the photodiodes and the node that does not receive charges is circularly permutated in each new phase, the charges received by the other storage nodes being digitized and added together over the various phases of a period and over N successive periods in sync with the movement to build added results, in such a way that the added results originate each time from two adjacent photodiodes that are not the same during the P phases but that are those that have seen the same image portion during the cycle of P phases.

8. The image sensor as claimed in claim 2, wherein selecting means are provided for selecting independently of each other the central node or the downstream node in order to read the charges that are contained thereon, and wherein at the end of the first phase, after the charges have been transferred to the central node, the charges on this node are converted in the conversion circuit of rank i associated with the pixel of rank i.

9. The image sensor as claimed in claim 2, wherein the central node and the downstream node are electrically connected by a conductor so as to form an electrically common node, and wherein the charges contained on the electrically common node are converted in the conversion circuit of rank i only at the end of the second phase but not at the end of the first phase.

10. The image sensor as claimed in claim 9, wherein means for resetting the common node are provided in order to reset this node during the first phase before charges are transferred to the central node, but not during the second phase.

11. The sensor as claimed in claim 2 wherein the analog/digital conversion circuits each comprise a counter the contents of which is incremented proportionally to the analog value of the signal to be converted, and the contents of the counter corresponding to the pixel of rank i is set, at the start of a periodic two-phase cycle, but not between two phases of the same cycle, to a value that is the result accumulated by the counter of the conversion circuit of the preceding rank i−1.

12. The sensor as claimed in claim 3 wherein the analog/digital conversion circuits each comprise a counter the contents of which is incremented proportionally to the analog value of the signal to be converted, and the contents of the counter corresponding to the pixel of rank i is set, at the start of a periodic two-phase cycle, but not between two phases of the same cycle, to a value that is the result accumulated by the counter of the conversion circuit of the preceding rank i−1.

13. The sensor as claimed in claim 4 wherein the analog/digital conversion circuits each comprise a counter the contents of which is incremented proportionally to the analog value of the signal to be converted, and the contents of the counter corresponding to the pixel of rank i is set, at the start of a periodic two-phase cycle, but not between two phases of the same cycle, to a value that is the result accumulated by the counter of the conversion circuit of the preceding rank i−1.

14. The sensor as claimed in claim 5 wherein the analog/digital conversion circuits each comprise a counter the contents of which is incremented proportionally to the analog value of the signal to be converted, and the contents of the counter corresponding to the pixel of rank i is set, at the start of a periodic two-phase cycle, but not between two phases of the same cycle, to a value that is the result accumulated by the counter of the conversion circuit of the preceding rank i−1.

15. The sensor as claimed in claim 8 wherein the analog/digital conversion circuits each comprise a counter the contents of which is incremented proportionally to the analog value of the signal to be converted, and the contents of the counter corresponding to the pixel of rank i is set, at the start of a periodic two-phase cycle, but not between two phases of the same cycle, to a value that is the result accumulated by the counter of the conversion circuit of the preceding rank i−1.

16. The sensor as claimed in claim 9 wherein the analog/digital conversion circuits each comprise a counter the contents of which is incremented proportionally to the analog value of the signal to be converted, and the contents of the counter corresponding to the pixel of rank i is set, at the start of a periodic two-phase cycle, but not between two phases of the same cycle, to a value that is the result accumulated by the counter of the conversion circuit of the preceding rank i−1.

17. The sensor as claimed in claim 10 wherein the analog/digital conversion circuits each comprise a counter the contents of which is incremented proportionally to the analog value of the signal to be converted, and the contents of the counter corresponding to the pixel of rank i is set, at the start of a periodic two-phase cycle, but not between two phases of the same cycle, to a value that is the result accumulated by the counter of the conversion circuit of the preceding rank i−1.

* * * * *